3,082,080
LEACHING OF CHROMIUM, NICKEL, COBALT AND MANGANESE FROM ORES

Courtney S. Simons, Chalmette, La., assignor to Freeport Sulphur Company, New York, N.Y., a corporation of Delaware
No Drawing. Filed May 2, 1960, Ser. No. 25,882
7 Claims. (Cl. 75—119)

This invention relates to the recovery of chromium along with any of nickel, cobalt, manganese and other valuable metals from ores composed wholly or mostly of lateritic, limonite minerals containing said valuable metals along with substantial amounts of iron. These ores contain relatively small quantities of these valuable metals amounting to less, and in most instances very much less, than five percent each in combination with the iron.

Up to the present time, chromium has been recovered substantially only from high grade ores generally containing from 50–60% chromium, as chromic oxide, in combination with 12–25% iron, as ferrous oxide. As far as is known, no one has provided an economically acceptable process for the recovery of chromium from minerals or ores of very low grade, as those containing less than about five percent chromium, although numerous ores exist which contain this small chromium content, the chromium being in combination with three and a half to five times as much iron and with small amounts of other valuable metals which could be recovered.

An object of the invention is to recover the chromium in an economically acceptable process from these very low grade ores.

An object of the invention is to recover separately chromium and either nickel or cobalt or both from such ores while leaving the iron in the tailings.

A further object is to provide a process for the recovery of chromium, nickel, cobalt and other valuable metals from such high iron content ores which is highly effective in its selective action and is capable of providing tailings containing the iron in a condition sufficiently free of such other metals that it can be economically employed as a blast furnace feed, thereby to provide a process of materially increased over-all economic value in relation to prior nickel and cobalt recovery processes wherein the chromium was left in the tailings, rendering the same unacceptable as a blast furnace feed.

A final object is to provide a process for the separate recovery of manganese, chromium and other valuable metals from mixed ores, one of which is an ore, containing a manganic oxide mineral and the other of which is of the type hereinbefore described.

In broad concept, the process of the invention involves the selective dissolution of chromium from iron contained in lateritic, limonite ores by subjecting the ore in aqueous slurry form to the action of sulfuric acid or other suitable sulfating agent in an amount sufficient to dissolve the chromium content but not the iron content, at a temperature of at least 450° F. under superatmospheric pressure, and during the heating oxidizing the chromium present to a form soluble in the acid. When the dissolution of the chromium has taken place, the product liquor is separated from the tailings containing the iron.

As to a most important embodiment, the invention may be broadly described as involving processes for the selective dissolution and recovery of chromium with either nickel or cobalt or both and also other valuable metals if present from lateritic, limonite ores involving mixing said ore with a tetravalent manganic oxide mineral and with sulfuric acid and water in quantities which solubilize the chromium and other valuable metals to be recovered, heating the resulting slurry to a temperature of 475° F. or slightly higher under superatmospheric pressure until the dissolution of the valuable metals has taken place and separating the product liquor containing the dissolved valuable metals from the ore tailings containing the iron. The nickel, cobalt, chromium and manganese present in the mixture are extracted from the ore in good yields by this leaching operation and are present in the leach liquor in the form of soluble salts or ions. The tailings obtained, as by filtration, is composed of iron oxide in sufficiently pure state for use as blast furnace feed. The product leach liquor is thereupon treated to separate the valuable metals therefrom and from each other such that commercially saleable compounds or free metals are provided.

The invention is applicable to the treatment of lateritic, limonite ores in general such as are found in several parts of the world including Brazil, Venezuela, New Caledonia, Indonesia and the Philippines, and is particularly applicable to the Moa Bay or found in Cuba.

The manganic oxide minerals suitable for the practice of the present invention may be more or less concentrated or may be in combination with other minerals. Examples of suitable minerals include pyrolucite, ramsdellite, manganite, braunite and hausmannite.

In a preferred embodiment of the invention the manganic oxide mineral which liberates active oxygen on decomposition is supplied by a high manganese ore, or ore concentrate. A typical analysis of suitable concentrate is set out below following an analysis of a typical sample of Moa Bay ore.

Moa Bay ore:
| | |
|---|---|
| Ni | 1.35 |
| Co | 0.146 |
| Fe | 47.5 |
| Al | 4.2 |
| Mg | 0.62 |
| Mn | 0.76 |
| Cr | 1.64 |
| Cu | 0.024 |
| Zn | 0.040 |
| $SiO_2$ | 3.30 |

San Isidro concentrate:
| | |
|---|---|
| Ni | .25 |
| Co | 0.068 |
| Fe | 24.0 |
| Al | 4.13 |
| Mg | 0.15 |
| Mn | 18.4 |
| Cr | 0.09 |
| Si | 4.92 |
| V | 0.035 |

A suitable manganese ore is one found in the Three Kids District of Nevada having typically, the analysis:

| | |
|---|---|
| $MnO_2$ | 56.04 |
| MnO | 7.08 |
| $Fe_2O_3$ | 1.68 |
| $Al_2O_3$ | 1.85 |
| $SiO_2$ | 13.73 |
| PbO | 2.07 |
| MgO | 1.40 |
| CuO | .49 |
| $H_2O$ | 11.25 |
| K and Na oxides | 3.82 |

The amount of sulfating agent employed in the leaching operation depends upon the proportion of valuable metals which will be sulfated in the process. The amount of sulfuric acid required is related to the theoretical quantity required to convert the nickel, cobalt, zinc and copper content to the bisulfate form, the aluminum to the basic bisulfate form and the magnesium to the sulfate form. A small amount of additional acid is required if the chromium and manganese are present in appreciable amounts or more than about one percent. In any particular operation of the process of the invention, the optimum amount of acid can and should be determined by tests under the prevalent conditions and in the equipment employed. Ordinarily the acid required for adequate chromium dissolution amounts to at least 40% of the dry weight of the ore. Amounts up to 100% have been used successfully. Excess acid should be avoided, for it reacts with and leaches out objectionable amounts of iron and aluminum and wastes sulfuric acid to the detriment of the economic success of the recovery operation.

The amount of manganic oxide mineral employed in the process is directly related to the amount of chromium present. Somewhat in excess of stoichiometric requirements is employed, as 1.2 times the equivalent. Increases up to 2.4 times show little or no advantage.

The ore to be leached is suitably dry mixed with the manganic oxide mineral, or ore concentrate containing the same, and thereupon the mixture is slurried to provide a flowable mass containing from about 10 to 45 or 50% solids of the ore to be leached. The slurry is next introduced into a suitable autoclave and thereupon the acid is added, preferably in concentrated form. The percent of solids in the slurry within the autoclave is thereby suitably reduced from 40 to 50% down to 25 to 35% solids. The ore mixture, water and acid can be brought together by any procedure in any order but the foregoing method is preferred. In the autoclave, the temperature and pressure is increased to a level which dissolves the valuable metals.

A minimum temperature of about 475° F. is required to achieve sufficient removal of the chromium content to produce ore tailings which are useful as blast furnace feed. Lower temperatures lead to lower yields of chromium, and at temperatures below about 450° F., the process does not appear to be economically feasible. Higher temperatures can be used, but levels higher than about 550° may be uneconomical in view of the requirement as to heavier equipment to take care of the higher pressures which would be developed. The pressure employed need only be at a sufficiently high level which is above the vapor pressure of the reaction mass. The treatment in the autoclave is continued for a period of several hours or until the leaching action has been completed. Heating longer than two hours leads only to a slight increase in yields.

The nickel, cobalt and other valuable metals are dissolved in the form of their sulfates and the chromium is oxidized, the same being present as oxidized chromate ions. Upon completion of the leaching operation the reaction mass, in accordance with the preferred procedure, is filtered or decanted to provide a product liquor containing substantially all of the nickel, cobalt, chromium, manganese and other valuable metals in the form of soluble salts or ions. The remaining tailings contains about 50% iron as iron oxide, which product is sufficiently pure to make the same valuable for blast furnace feed. To be acceptable for this purpose it is generally considered that the feed should not contain more than 0.1% nickel, nor more than 0.5% chromium nor more than 2.0% manganese (or more than 0.5%, for some products). If any tailings product obtained shows an excessive manganese residue, the excess manganese can be easily and economically extracted by treatment with sulfur dioxide or ferrous sulfate through processes known and described in the literature.

In accordance with the present invention, the product liquor obtained as described above is partially neutralized by the addition of coral or limestone or other cheap source of alkali to a pH level between 2 and 3, preferably 2.5. Thereupon sulfur dioxide is introduced into the resulting treated product liquor in an amount somewhat in excess of the stoichiometric equivalent in relation to the chromate ions whereby the chromate is reduced to a chromium compound of lower valence. For this reduction other reducing gases such as hydrogen sulfide can be employed. During the introduction of the reducing gases the liquor is heated to bring about the reaction, suitably to a temperature of about 180° F., at atmospheric pressure.

When the reduction of the chromate is complete the resulting liquor is treated to precipitate the nickel and cobalt values by introducing hydrogen sulfide in known manner, such compounds being converted to their sulfides. These sulfides are then separated from the liquor by filtration or decantation and are thereafter further processed in known manner to convert the same to substantially pure metal products.

The filtrate or overflow obtained still containing the chromium, and also any aluminum which was dissolved, is then stripped of its dissolved hydrogen sulfide content by any suitable means such as by heating. The liberated hydrogen sulfide may then be collected and recycled to the hereinbefore described step in which the nickel and cobalt content is precipitated. Thereupon limestone or other alkali is added to the stripped filtrate or over-flow to neutralize the free acid and precipitate the chromium and aluminum, if present, in the form of their hydroxides and/or basic carbonates. This may be accomplished by adjusting the pH value to 4.5 and heating, as to 185° F. The resulting mass is then filtered or decanted to separate the precipitated chromium and aluminum. These hydroxides and/or carbonates may thereafter be treated to recover the chromium metal in pure form in accordance with procedures not constituting part of the invention. The chromium may be recovered, for example, by roasting the product and then subjecting the same to an aluminothermic reduction.

The filtrate or over-flow obtained in the last mentioned separation step is then treated for the recovery of its manganese content. To accomplish this result an alkali is added, suitably a mixture of lime or alkali with limestone, the amount added being sufficient to raise the pH level to about 8 to 9. By this procedure the manganese is precipitated in the form of its carbonate. The manganese precipitate may then be processed by any suitable means to obtain a commercially acceptable manganese metal. One such known method of recovery involves treating the manganese carbonate with nitric acid to obtain manganese nitrate and then decomposing this nitrate to yield manganese dioxide, in which process the nitric acid is recovered and can be recycled. This manganese dioxide obtained may then be processed to convert it to the metal form. In an alternative treatment of the product leach liquor obtained from the autoclave, it is first purified by removing the small but sometimes undesired content of iron and aluminum present. This result is accomplished by adding sufficient alkali, as coral or limestone, to provide a pH value of 4 to 5 which causes the iron and aluminum content to precipitate, and then removing the precipitate by filtering or decanting. The thus purified product leach liquor is then treated in accordance with the hereinbefore described process starting with the chromium reduction step preferably using sulfur dioxide.

In the examples below, a typical Moa Bay ore containing the following was used: chromium, 1.774%; nickel 1.403%; cobalt, 0.129%, iron 46.63%, and lesser amounts of other valuable metals, and as well, some magnesium and aluminum.

*Example 1*

The Moa Bay ore was mixed with a San Isidro concentrate of the analysis already described and was slurried in acid and water, the amount of acid being 40% of the weight of the dry Moa Bay ore and the amount of water being one which provided an aqueous slurry of 15% ore solids. The amount of the concentrate added provided manganese in a quantity constituting 1.2 times the amount stoichiometrically required to react with and oxidize the chromium present. In an autoclave, the resulting mixture was heated to a temperature of 500° F. and held there two hours. After release of the pressure the product liquor was separated from the tailings. An analysis of the tailings showed that most of the chromium and substantially all of the nickel and cobalt had been removed therefrom. Its iron content was nearly 50%. It met the purity requirements for blast furnace feed.

The product leach liquor was thereupon treated in accordance with the preferred process hereinbefore disclosed for the separation and separate recovery of the chromium, nickel, cobalt, and manganese.

*Example 2*

The process of the foregoing example was repeated with the change that the amount of acid was increased to 50% and the temperature was reduced to 475° F. and the percent solids was increased to 30%. Through these changes, a much more concentrated liquor was obtained but the percentages of the metals dissolved remained about the same.

The amount of valuable metals recovered, and in particular the chromium, can be increased somewhat by retreating the tailings in exactly the same way.

It should be understood that the present invention is not limited to the specific ores, reactants or conditions herein disclosed but that it extends to all equivalents which will occur to those skilled in the art upon consideration of the mode of operation of the invention and the scope of the claims appended hereto.

I claim:

1. A process for the selective dissolution of chromium and nickel from iron contained in lateritic, limonite ores containing said metals which comprises, mixing said ore with a tetravalent manganic oxide mineral in a quantity at least equivalent to the quantity stoichiometrically calculated to oxidize the chromium to a form soluble in sulfuric acid, and with sulfuric acid and water to form a slurry, the quantity of sulfuric acid equalling at least 40% of the dry weight of said ore and being sufficient to solubilize the nickel and chromium but not the iron present under the heating conditions hereinafter specified, heating the mixture to a temperature of at least 475° F. under superatmospheric pressure until the dissolution has taken place and separating the solution containing the dissolved chromium and nickel from the ore tailings containing the iron.

2. A process for the treatment of lateritic, limonite ore containing chromium for the recovery of the chromium and for the production of iron ore of blast furnace grade which comprises, mixing said ore with a tetravalent mangenic oxide mineral in a quantity at least equivalent to the quantity stoichiometrically calculated to oxidize the chromium to a form soluble in sulfuric acid, and with sulfuric acid and water to form a slurry, the quantity of sulphuric acid equalling at least 40% of the dry weight of said ore and being present in the slurry in a quantity required by predetermination to solubilize under the conditions hereinafter specified the chromium content but not any substantial proportion of the iron present, heating the resulting mixture to a temperature of at least 475° F. under superatmospheric pressure until the chromium dissolves, and separating the resulting solution containing the chromium from the ore tailings containing the iron.

3. A process for the separation of chromium, manganese and other non-ferrous metals from the iron content of ores containing said metals which comprises, mixing a lateritic, limonite ore containing chromium and other valuable nonferrous metals to be recovered with an oxide ore containing tetravalent manganic oxide minerals in a quantity at least equivalent to the quantity stoichiometrically calculated to oxidize the chromium to a form soluble in sulfuric acid, and with sulfuric acid and water to form a slurry, the quantity of sulphuric acid equalling at least 40% of the dry weight of said ore and being present in the slurry in a quantity required in the process to solubilize only the chromium, manganese and other non-ferrous metal content to be recovered, heating the resulting mixture to a temperature of at least about 450° F. until the non-ferrous metals have been dissolved, and separating the resulting solution containing said solubilized metals from the ore tailings containing the iron.

4. A process for the recovery of chromium and at least one of nickel and cobalt and as well any other valuable non-ferrous metal present in the lateritic, limonite ore to be treated, which comprises mixing the limonite ore having a content of said metals to be recovered with a tetravalent manganic oxide mineral in a quantity at least equivalent to the quantity stoichiometrically calculated to oxidize the chromium to a form soluble in sulfuric acid, and with sulfuric acid and water to form a slurry, the quantity of sulphuric acid equalling at least 40% of the dry weight of said ore and being present in the slurry in a quantity required in the process to solubilize only the non-ferrous metals to be recovered, heating the resulting mixture to a temperature of at least about 450° F. until the chromium and other desired non-ferrous metals have dissolved, separating the resulting product liquor containing the said solubilized metals from the ore tailings containing the iron, subjecting the product liquor to the action of a reducing agent which reduces the dichromate ions, converting the content of nickel and cobalt in said altered solution to the sulfide precipitate form and separating the precipitate from the solution still containing the chromium therein.

5. A process for the recovery of chromium and at least one of nickel and cobalt and as well any other valuable non-ferrous metal present in the lateritic, limonite ore to be treated, which comprises mixing the limonite ore having a content of said metals to be recovered with a tetravalent manganic oxide material in a quantity at least equivalent to the quantity stoichiometrically calculated to oxidize the chromium to a form soluble in sulfuric acid, and with sulfuric acid and water to form a slurry, the quantity of sulphuric acid squalling at least 40% of the dry weight of said ore and being present in the slurry in a quantity required in the process to solubilize only the non-ferrous metals to be recovered, heating the resulting mixture to a temperature of at least about 450° F. until the chromium and other desired non-ferrous metals have dissolved, separating the resulting product liquor containing the said solubilized metals from the ore tailings containing the iron, adjusting the pH of the product liquor to a value of 2–3, introducing sulfur dioxide into the resulting solution in heated condition until the chromate ions are reduced, next introducing hydrogen sulfide into the solution thereby to precipitate the nickel cobalt content and separating the precipitate from the solution still containing the chromium therein.

6. A process for the recovery of chromium, at least one of nickel and cobalt, and also manganese from ores containing the same which comprises, mixing a lateritic limonite ore containing chromium and at least one of nickel and cobalt with a manganic oxide mineral in a quantity at least equivalent to the quantity stoichiometrically calculated to oxidize the chromium to a form soluble in sulfuric acid, and with sulfuric acid and water to form a slurry, the quantity of sulphuric acid equalling at least 40% of the dry weight of said ore and being present in the slurry in a quantity which will dissolve substantially only the chromium, the nickel-cobalt content and the manganese, heating the resulting mixture to a temperature of about 475° F. until the chromium and other desired valuable metals have dissolved, separating the resulting solution containing said dissolved metals from the ore tailings containing the iron, subjecting the product liquor to the action of a reducing agent which reduces the dichromate ions, converting the content of nickel and cobalt in said altered solution to the sulfide precipitate form, separating the precipitate from the solution still containing the chromium and the manganese, precipitating the chromium from the solution by adding an alkaline agent and separating the precipitated chromium compound from the solution still containing the manganese.

7. A process for the selective separation of chromium, nickel and other non-ferrous metals from oxidic iron ore containing the same comprising, mixing said ore with a predetermined quantity of tetravalent manganic oxide mineral slightly in excess of that required to oxidize the chromium to a form soluble in sulfuric acid, adding water and a predetermined quantity of sulfuric acid stoichiometrically calculated to react with and solubilize only the non-ferrous metals including the oxidized chromium in said mixture of ore and manganic mineral, the quantity of water being sufficient to form a slurry and the quantity of sulfuric acid equalling at least 40% of the dry weight of said ore, heating said aqueous acid-ore-mineral mixture to at least 450° F. under superatmospheric pressure until dissolution of said non-ferrous metals has taken place, and separating the resulting product liquor containing the dissolved salts of said non-ferrous metals from the ore tailings containing the iron.

References Cited in the file of this patent

UNITED STATES PATENTS

| | | |
|---|---|---|
| 981,451 | McKechnie | Jan. 10, 1911 |
| 2,176,774 | Sweet et al. | Oct. 17, 1939 |
| 2,601,306 | Lloyd | June 24, 1952 |
| 2,726,953 | Roy et al. | Dec. 13, 1955 |
| 2,776,207 | Mancke | Jan. 1, 1957 |
| 2,805,939 | Schaufelberger | Sept. 10, 1957 |

OTHER REFERENCES

Scott: Standard Methods of Chemical Analyses, vol. 1, 4th ed., D. Van Nostrand Co., New York, 1925, page 159 only relied on.